United States Patent
Liu et al.

(10) Patent No.: US 12,137,296 B1
(45) Date of Patent: Nov. 5, 2024

(54) OPTIMIZED PIXEL DESIGN FOR MITIGATING MIM IMAGE LAG

(71) Applicant: OMNIVISION TECHNOLOGIES, INC., Santa Clara, CA (US)

(72) Inventors: Yuanliang Liu, San Jose, CA (US); Bill Phan, Sunnyvale, CA (US); Duli Mao, Sunnyvale, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 73 days.

(21) Appl. No.: 18/298,975

(22) Filed: Apr. 11, 2023

(51) Int. Cl.
*H04N 25/771* (2023.01)
*H04N 25/59* (2023.01)

(52) U.S. Cl.
CPC ........... *H04N 25/771* (2023.01); *H04N 25/59* (2023.01)

(58) Field of Classification Search
CPC ...... H04N 25/771; H04N 25/59; H04N 25/77; H04N 5/78; H04N 25/57; H04N 23/741
See application file for complete search history.

(56) References Cited

U.S. PATENT DOCUMENTS

| | | | | |
|---|---|---|---|---|
| 11,399,150 B2* | 7/2022 | Gao | ...................... | H04N 25/778 |
| 11,765,484 B1* | 9/2023 | Choi | ..................... | H04N 25/771 |
| | | | | 348/308 |
| 2022/0264038 A1* | 8/2022 | Innocent | ................ | H04N 25/75 |
| 2022/0385852 A1* | 12/2022 | Miyauchi | ............... | H04N 25/46 |
| 2023/0232133 A1* | 7/2023 | Miyauchi | ............. | H04N 25/778 |
| | | | | 348/207.99 |
| 2023/0421921 A1* | 12/2023 | Choi | ..................... | H04N 25/621 |
| 2023/0421922 A1* | 12/2023 | Gao | .................. | H01L 27/14609 |
| 2024/0022836 A1* | 1/2024 | Miyauchi | ............... | H04N 25/42 |
| 2024/0214707 A1* | 6/2024 | Mori | ...................... | H04N 25/70 |
| 2024/0244350 A1* | 7/2024 | Phan | ...................... | H04N 25/77 |

* cited by examiner

*Primary Examiner* — Nhan T Tran
(74) *Attorney, Agent, or Firm* — Perkins Coie LLP (57) ABSTRACT

A pixel circuit includes a photodiode configured to photogenerate image charge in response to incident light. A transfer transistor is coupled between the photodiode and a floating diffusion to transfer the image charge from the photodiode to the floating diffusion. A reset transistor is coupled between a pixel voltage source and the floating diffusion. A lateral overflow integration capacitor (LOFIC) network includes a first LOFIC coupled between the floating diffusion and the first bias voltage source, and a second LOFIC coupled between the floating diffusion and the second bias voltage source. The first LOFIC is configured to be forward biased and the second LOFIC is configured to be reverse biased at an end of an integration period, and image charge discharged from the first LOFIC and image charge discharged from the second LOFIC compensate each other during a readout period.

20 Claims, 8 Drawing Sheets

OPTIMIZED PIXEL DESIGN FOR MITIGATING MIM IMAGE LAG

TECHNICAL FIELD

This disclosure relates generally to image sensors, and in particular but not exclusively, relates to high dynamic range (HDR) complementary metal oxide semiconductor (CMOS) image sensors.

BACKGROUND

Image sensors have become ubiquitous and are now widely used in digital cameras, cellular phones, security cameras, as well as in medical, automotive, and other applications. As image sensors are integrated into a broader range of electronic devices, it is desirable to enhance their functionality, performance metrics, and the like in as many ways as possible (e.g., resolution, power consumption, dynamic range) through both device architecture design as well as image acquisition processing. The technology used to manufacture image sensors has continued to advance at a great pace. For example, the demands of higher resolution and lower power consumption have encouraged the further miniaturization and integration of these devices.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to produce digital images (e.g., image data) representing the external scene. The analog image signals on the bitlines are coupled to readout circuits, which include input stages having analog-to-digital conversion (ADC) circuits to convert those analog image signals from the pixel array into the digital image signals.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. In addition, common but well-understood elements that are useful or necessary in a commercially feasible embodiment are often not depicted in order to facilitate a less obstructed view of these various embodiments of the present disclosure.

DETAILED DESCRIPTION

Examples directed to an imaging system with a pixel circuit including lateral overflow integration capacitors (LOFICs) providing reduced metal-insulator-metal (MIM) induced image lag are disclosed. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present disclosure. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "over," "under," "above," "upper," "top," "bottom," "left," "right," "center," "middle," and the like, may be used herein for case of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of an imaging system with a pixel circuit including lateral overflow integration capacitors (LOFICs) providing reduced metal-insulator-metal (MIM) induced image lag are disclosed. It is appreciated that LOFICs may be included in pixel circuits to increase the full well capacity of the pixel circuits and thereby increase high dynamic range capabilities of corresponding image sensors. LOFIC capacitance is positively correlated with full well capacity. Thus, as the capacitance of a LOFIC employed in a pixel circuit increases, the full well capacity of the pixel circuit also increases. For this reason, high LOFIC capacitance is commonly desired. However, due to the huge RC loading as the capacitance of a LOFIC increases, the time required for row drivers of the imaging system to charge and/or reset the LOFIC also increases. Consequently, as the capacitances of LOFICs in pixel circuits increase, image lag increases, which causes slower frame rates.

It is appreciated that the image lag caused by LOFICs can be associated with the high dielectric constant or high-k material included in the insulation material of MIM LOFICs due to the hysteresis characteristics and slow relaxation behavior of high-k materials. The high-k material relaxation behavior can cause the degraded image quality such as image lag due to many mechanisms including trap-to-trap tunneling, structural relaxation, coupling with phonon energy, etc.

Some imaging systems include pixel circuits that each have a LOFIC configured to be reversed biased during idle periods. This compensates for or cancels residual charges in the LOFIC to reduce LOFIC discharge times and thereby reduce image lag. However, this approach can cause other issues such as dark image non-uniformity (DINU).

Thus, as will be shown and described in the various examples below, an example pixel circuit includes a photodiode configured to photogenerate image charge in response to incident light. A floating diffusion is coupled to receive the image charge from the photodiode. A transfer transistor is coupled between the photodiode and the floating diffusion to transfer the image charge from the photodiode to the floating diffusion. A reset transistor is coupled between a pixel voltage source and the floating diffusion. A lateral overflow integration capacitor (LOFIC) network coupled to the floating diffusion, a first bias voltage source, and a second bias voltage source. The LOFIC network includes a first LOFIC coupled between the floating diffusion and the first bias voltage source, and a second LOFIC coupled between the floating diffusion and the second bias voltage source. The first LOFIC is configured to be forward biased and the second LOFIC is configured to be reverse biased at an end of an integration period, and image charge discharged from the first LOFIC and image charge discharged from the second LOFIC compensate each other during a readout period.

In the various examples, each of the first LOFIC and the second LOFIC is a metal-insulator-metal (MIM) storage capacitor that includes a high-k material disposed between a first metal electrode and a second metal electrode. In various examples, the high-k material may be formed of a single layer or a multiple layer stack of high-k insulating material. In various examples, high-k material may include one of aluminum oxide ($Al_2O_3$), Zirconium dioxide ($ZrO_2$), Hafnium oxide (HfO), or a combination thereof.

Figure 1:
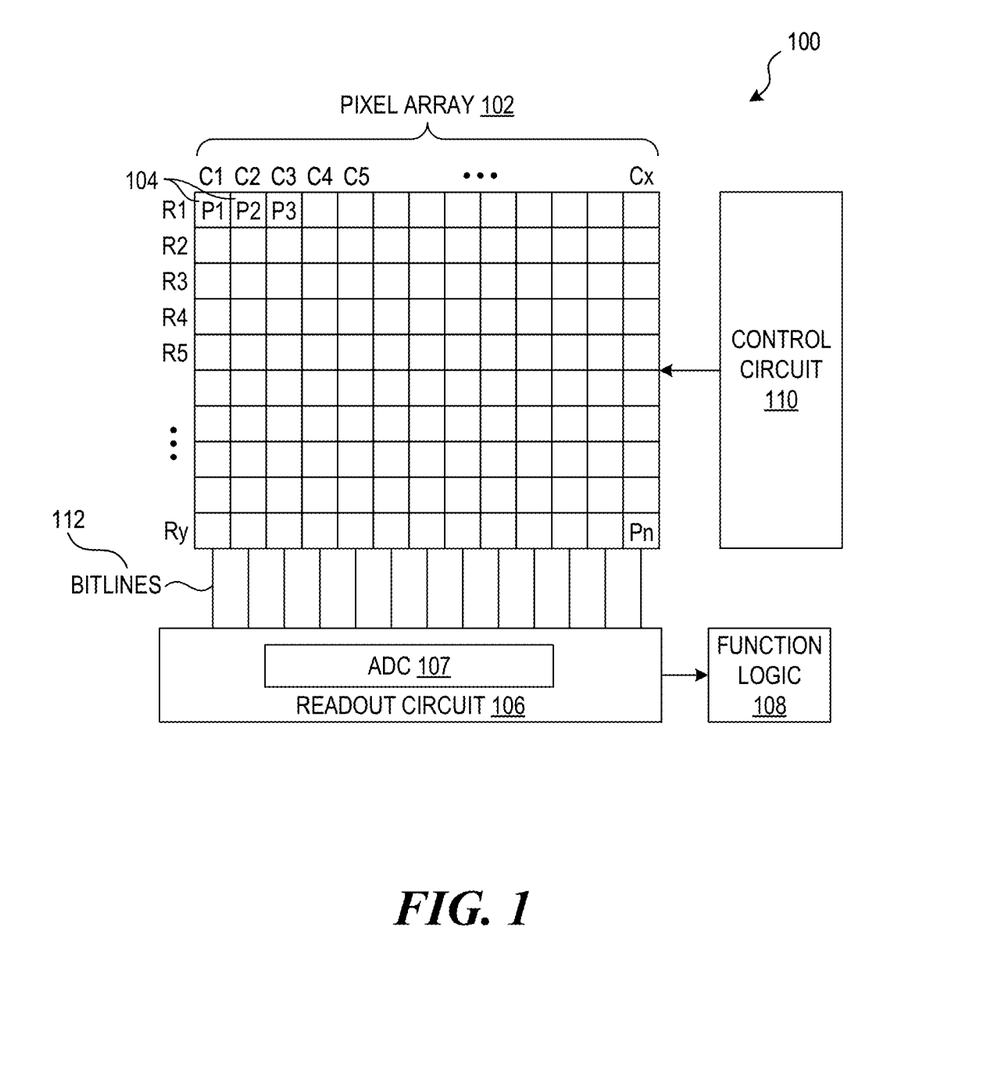
FIG. 1 illustrates one example of an imaging system including a pixel array in accordance with the teachings of the present disclosure.

To illustrate, FIG. 1 shows one example of an imaging system 100 having a readout circuit 106 in accordance with the teachings of the present disclosure. In particular, the example depicted in FIG. 1 illustrates an imaging system 100 that includes a pixel array 102, bitlines 112, a control circuit 110, a readout circuit 106, and function logic 108. In one example, pixel array 102 is a two-dimensional (2D) array including a plurality of pixel circuits 104 (e.g., P1, P2, ..., Pn) that are arranged into rows (e.g., R1 to Ry) and columns (e.g., C1 to Cx) to acquire image data of a person, place, object, etc., which can then be used to render an image of a person, place, object, etc. In various examples, at least one of the plurality of pixel circuits 104 (e.g., P1, P2, ..., Pn) includes aforementioned LOFIC network circuitry.

In various examples, the readout circuit 106 may be configured to read out the image signals through the column bitlines 112. As will be discussed, in the various examples, readout circuit 106 may include an analog-to-digital converter (ADC) 107 in accordance with the teachings of the present disclosure. In the example, the digital image data values generated by the analog to digital converter 107 in readout circuit 106 may then be received by function logic 108. Function logic 108 may simply store the digital image data or even manipulate the digital image data by applying post image effects (e.g., crop, rotate, remove red eye, adjust brightness, adjust contrast, or otherwise).

In one example, control circuit 110 is coupled to pixel array 102 to control operation of the plurality of photodiodes in pixel array 102. For example, control circuit 110 may generate a rolling shutter or a shutter signal for controlling image acquisition. In other examples, image acquisition is synchronized with lighting effects such as a flash.

In one example, imaging system 100 is implemented on a single semiconductor wafer. In another example, imaging system 100 is on stacked semiconductor wafers. For example, pixel array 102 can be implemented on a pixel wafer, while readout circuit 106, control circuit 110, and function logic can be implemented on an application specific integrated circuit (ASIC) wafer, where the pixel wafer and the ASIC wafer are interconnected by bonding (hybrid bonding, oxide bonding, or the like) or one or more through substrate vias (TSVs). In another example, pixel array 102 and control circuit 110 are implemented on a pixel wafer, while readout circuit 106 and function logic 108 are implemented on an ASIC wafer, where the pixel wafer and the ASIC wafer are stacked and interconnected by bonding (hybrid bonding, oxide bonding, or the like) or one or more TSVs.

In one example, imaging system 100 may be included in a digital camera, a cell phone, a laptop computer, an endoscope, a security camera, an imaging device for a head-mounted display device or an imaging device for automobile, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 2:
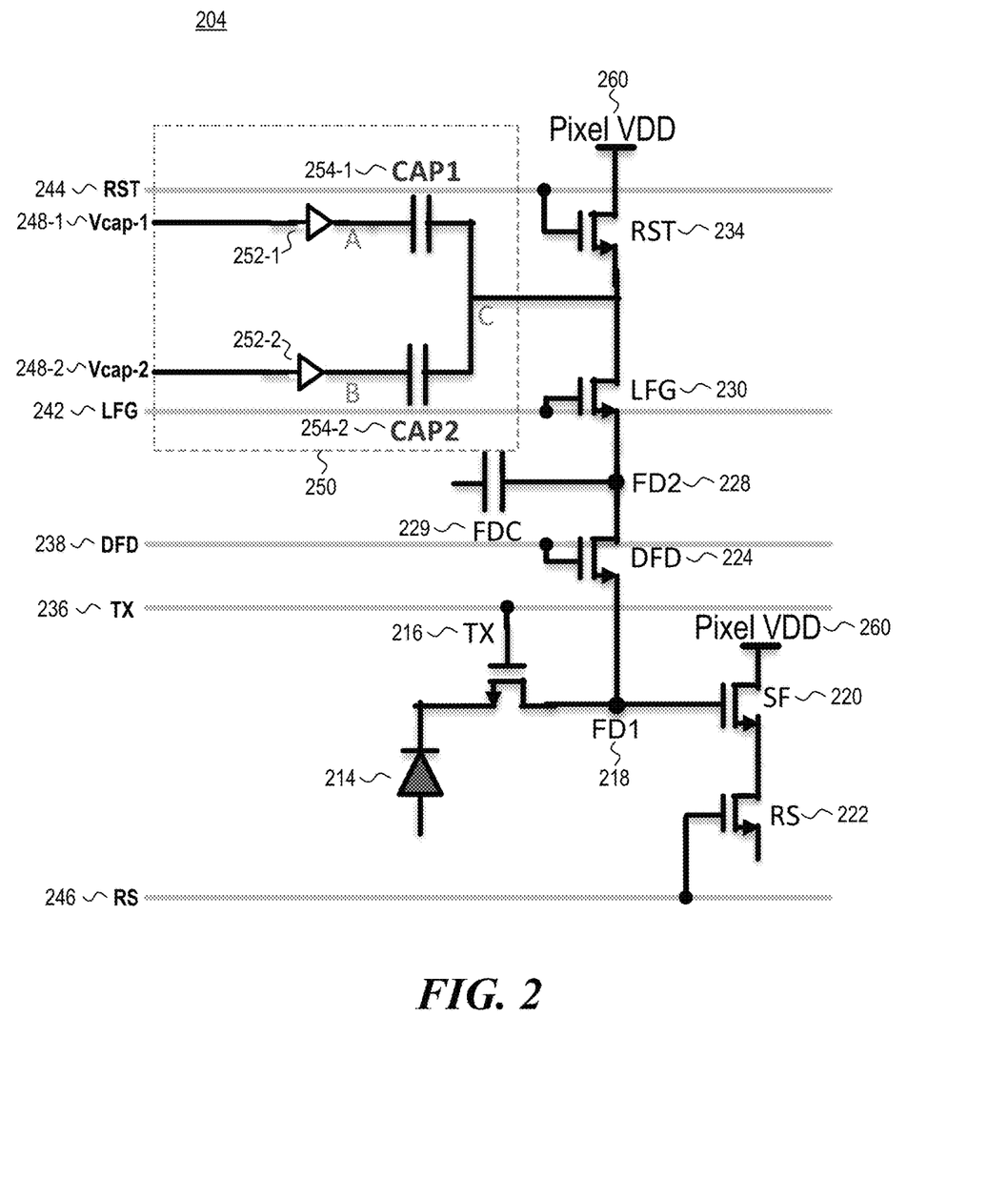
FIG. 2 illustrates a schematic of an example pixel circuit including lateral overflow integration capacitors (LOFICs) in accordance with the teachings of the present disclosure.

FIG. 2 illustrates a schematic of an example pixel circuit 204 including lateral overflow integration capacitors (LO- FICs) 254 in accordance with the teachings of the present disclosure. It is appreciated that the pixel circuit 204 of FIG. 2 may be an example of the pixel circuits 104 included in the imaging system 100 as shown in FIG. 1, and that similarly named and numbered elements described above are coupled and function similarly below.

In the illustrated example, the pixel circuit 204 includes a photodiode 214 configured to photogenerate image charge in response to incident light. A first floating diffusion FD1 218 is coupled to receive the image charge from the photodiode 214. A transfer transistor TX 216 is coupled between the photodiode 214 and the first floating diffusion FD1 218 to transfer the image charge from the photodiode 214 to the first floating diffusion FD1 218. A reset transistor RST 234 is coupled between a pixel voltage source Pixel VDD 260 and the first floating diffusion FD1 218. A lateral overflow gate transistor LFG 230 is coupled between the reset transistor RST 234 and the first floating diffusion FD1 218. A dual floating diffusion transistor DFD 224 is coupled between the lateral overflow gate transistor LFG 230 and the first floating diffusion FD1 218. A second floating diffusion FD2 228 is coupled between the lateral overflow gate transistor LFG 230 and the dual floating diffusion transistor DFD 224. A floating diffusion capacitor FDC 229 is coupled to the second floating diffusion FD2 228. A source follower transistor SF 220 is coupled between the pixel voltage source Pixel VDD 260 and a row select transistor RS 222, which is coupled to a bitline (e.g., column bitline 112 of FIG. 1). The gate terminal of the source follower transistor SF 220 is coupled to the first floating diffusion FD1 218.

The transfer transistor TX 216 is configured to be switched in response to a transfer control signal TX 236. The reset transistor RST 234 is configured to be switched in response to a reset control signal RST 244 and is configured to reset the pixel circuit 204 during, for example, an idle period, a precharge period, and between image signal and reset signal readouts. The dual floating diffusion transistor DFD 224 is configured to be switched in response to a dual floating diffusion control signal DFD 238 and is configured to transfer image charge from the first floating diffusion FD1 218 to the second floating diffusion FD2 228 allowing image charges overflowing from the photodiode 214 to the second floating diffusion FD2 228 through the first floating diffusion FD1 218 when photodiode 214 is saturated. The lateral overflow gate transistor LFG 230 is configured to be switched in response to a lateral overflow gate control signal LFG 242. The row select transistor RS 222 is configured to be switched in response to a row select control signal RS 246 and is configured to transfer signals from the source follower transistor SF 220 to the bitline. It is appreciated that the pixel circuit 204 can include fewer, additional, and/or alternative components (e.g., transistors, capacitors, buffers, switches) depending on the particular requirements of the imaging system.

The pixel circuit 204 further includes a lateral overflow integration capacitor (LOFIC) network 250 coupled to the first floating diffusion FD1 218, a first bias voltage source Vcap-1 248-1, and a second bias voltage source Vcap-2 248-2. In the illustrated example, the LOFIC network 250 is coupled to a node between the reset transistor RST 234 and the lateral overflow gate transistor LFG 230. The LOFIC network 250 can include a first LOFIC CAP1 254-1 coupled between the first floating diffusion FD1 218 and the first bias voltage source Vcap-1 248-1, and a second LOFIC CAP2 254-2 coupled between the first floating diffusion FD1 218 and the second bias voltage source Vcap-2 248-2. The lateral overflow gate transistor LFG 230 is configured (e.g., through proper gate biasing with the lateral overflow gate control signal LFG 242) to transfer overflow charges from the second floating diffusion FD2 228 to the first LOFIC CAP1 254-1 or the second LOFIC CAP2 254-2. The LOFIC network 250 can further include a first voltage buffer 252-1 coupled between the first LOFIC 254-1 and the first bias voltage source Vcap-1 248-1, and a second voltage buffer 252-2 coupled between the second LOFIC 254-2 and the second bias voltage source Vcap-2 248-2.

It is appreciated that each LOFIC 254-1, 254-2 includes a first metal electrode, which may be referred to as a capacitor top metal (CTM), and a second metal electrode, which may be referred to as a capacitor bottom metal (CBM). As such, the CTM of the first LOFIC 254-1 is coupled to the first voltage buffer 252-1 at node A, the CTM of the second LOFIC 254-2 is coupled to the second voltage buffer 252-2 at node B, and the CBMs of the first and second LOFICs 254-1, 254-2 are coupled to the lateral overflow gate transistor LFG 230 at node C. It is appreciated that the first bias voltage source Vcap-1 248-1 and the second bias voltage source Vcap-2 248-2 can be configured to forward bias, zero bias, or reverse bias the first and second LOFICs 254-1, 254-2, respectively, by adjusting the voltage values at nodes A and B higher than, equal to, or lower than the voltage value at node C. In some embodiments, a control circuit (e.g., the control circuit 110 illustrated in FIG. 1) can include circuitries modulating the voltage level supplied by the first and second bias voltage sources Vcap-1 248-1, Vcap-2 248-2. In some embodiments, the first and second bias voltage sources Vcap-1 248-1, Vcap-2 248-2 can be included on an ASIC wafer while the control circuit is included on a pixel wafer. In other embodiments, the first and second bias voltage sources Vcap-1 248-1, Vcap-2 248-2 can be included on an ASIC wafer with the control circuit.

Figure 3:
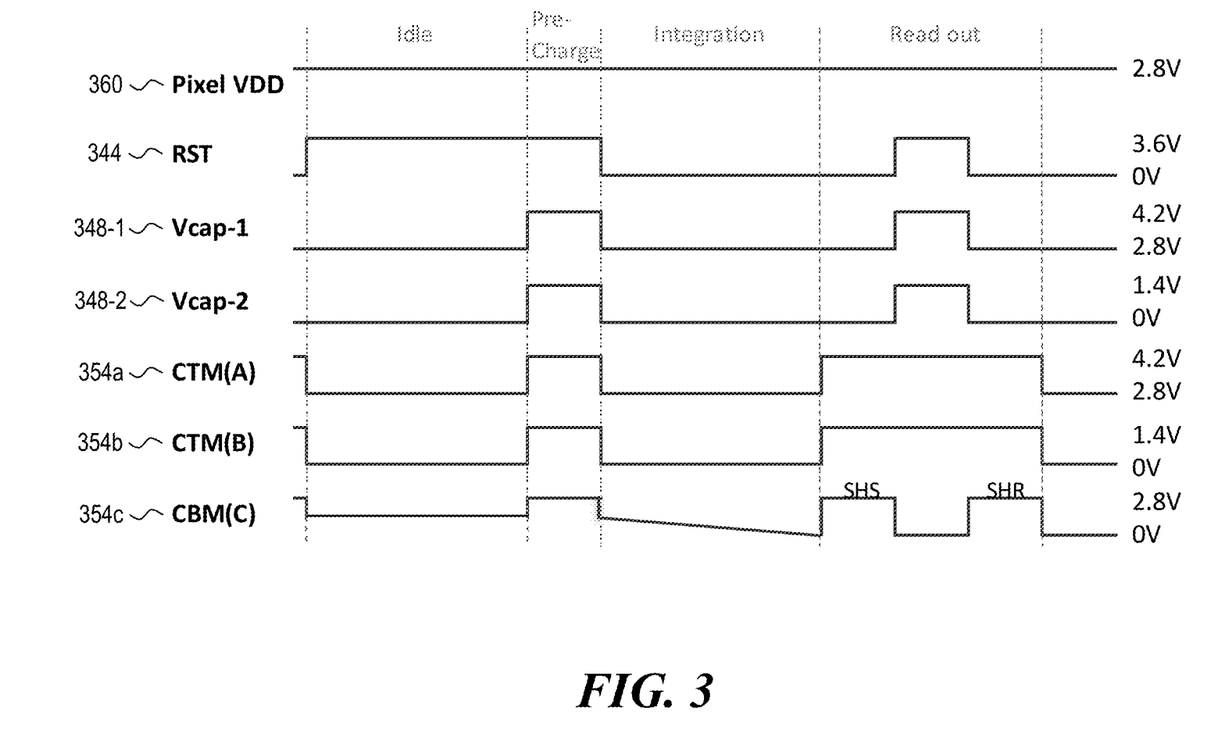
FIG. 3 illustrates a timing diagram of an example pixel circuit including LOFICs in accordance with the teachings of the present disclosure.

FIG. 3 illustrates a timing diagram of an example pixel circuit including LOFICs in accordance with the teachings of the present disclosure. It is appreciated that the timing diagram of FIG. 3 may be an example timing diagram of pixel circuit 204 as shown in FIG. 2, and that similarly named and numbered elements described above are coupled and function similarly below.

In the illustrated example, the timing diagram includes an idle period, a precharge period, an integration period, and a read out period. The idle period may be arranged between the read out period of the previous frame and the precharge period of the current frame. The timing diagram depicts a pixel voltage source Pixel VDD 360, a reset control signal RST 344, a first bias voltage source Vcap-1 348-1, a second bias voltage source Vcap-2 348-2, a voltage value at the CTM of a first LOFIC (e.g., at node A illustrated in FIG. 2) 354a, a voltage value at the CTM of a second LOFIC (e.g., at node B) 354b, and a voltage value at the CBM of the first and second LOFICs (e.g., at node C) 354c. In the illustrated example, the pixel voltage source Pixel VDD 360 is configured to remain at a constant non-zero value (e.g., ranging from 2.8 V to 3.6V) throughout the entire timing diagram.

The voltage values at CTM(A) 354a and CTM(B) 354b can be controlled by adjusting the voltage levels provided by the first and second bias voltage sources Vcap-1 348-1, Vcap-2 348-2, respectively, as well as through the use of buffers (e.g., the first and second voltage buffers 252-1, 252-2). The voltage value at CBM(C) 354c can vary depending on the overflow charges that flow from a photodiode (e.g., from the photodiode 214 and past the lateral overflow gate transistor LFG 230 and the dual floating diffusion transistor DFD 224). When the voltage value at CTM(A)

354a or CTM(B) 354b exceeds the voltage value at CBM(C) 354c, the first or second LOFIC is configured to be forward biased. Conversely, when the voltage value at CTM(A) 354a or CTM(B) 354b is smaller than the voltage value at CBM(C) 354c, the first or second LOFIC is configured to be reverse biased. When the voltage value at CTM(A) 354a or CTM(B) 354b is equal to the voltage value at CBM(C) 354c, the first or second LOFIC is configured to be zero biased.

As shown during the idle period, the reset control signal RST 344 is configured to be at a high value (e.g., ranging from 2.8V to 3.6 V) in order to reset the pixel circuit. The first bias voltage source Vcap-1 348-1, the second bias voltage source Vcap-2 348-2, the voltage value at CTM(A) 354a, and the voltage value at CTM(B) 354b are configured to be at their respective low values. The voltage value at CBM(C) 354c is configured to be at an intermediate value (e.g., ranging from 1.4V to 2.8V). As described in further detail below, the low values for the first bias voltage source Vcap-1 348-1 and the voltage value at CTM(A) can be configured to be non-zero (e.g., a voltage level ranging from 2.8 V to 4.2V) such that the first LOFIC can be forward biased. The low values for the second bias voltage source Vcap-2 348-2 and the voltage value at CTM(B) can be configured to be zero such that the second LOFIC can be reverse biased.

As shown during the precharge period following the idle period, the pixel voltage source Pixel VDD 360 and the reset control signal RST 344 can be configured to remain at their respective high values (e.g., 2.8 V and 3.6 V, respectively) and the remaining illustrated voltage values can be switched to their respective high values. In various examples, the high value for the first bias voltage source Vcap-1 348-1 and CTM(A) 354a can be 4.2 V, the high value for the second bias voltage source Vcap-2 348-2 and CTM(B) 354b can be 1.4 V, and the high value for CBM(C) 354c can be 2.8 V. In various examples, the voltage values of CTM(A) 354a, CTM(B) 354b, and CBM(C) 354c increase together such that the first LOFIC remains forward biased and the second LOFIC remains reverse biased during the precharge period.

As shown during the integration period following the precharge period, the reset control signal RST 344, the first bias voltage source Vcap-1 348-1, the second bias voltage source Vcap-2 348-2, the voltage value at CTM(A) 354a, and the voltage value at CTM(B) 354b are configured to be switched to their respective low values. The photodiode can be configured to photogenerate image charge in response to incident light. Overflow image charge from the photodiode can be configured to be transferred to the first and/or second LOFICs (e.g., transferred through the lateral overflow gate transistor LFG 230 and the dual floating diffusion transistor DFD 224), lowering the voltage value at CBM(C) 354c (e.g., from 1.4 V to 0.4 V). The decrease in voltage level at CBM(C) 354c depends on the amount of overflow image charges. In the illustrated timing diagram, the first and second LOFICs remain forward biased and reverse biased during the integration period, respectively.

As shown during the read out period after the integration period, a sample-and-hold image signal ("SHS") and a sample-and-hold reset signal ("SHR") are read out sequentially. In the illustrated example, the reset control signal RST 344, the first bias voltage source Vcap-1 348-1, and the second bias voltage source Vcap-2 348-2 are configured to pulse at their respective high values after the SHS readout in preparation for the SHR readout (e.g., 3.6 V, 4.2 V, and 1.4 V, respectively). The voltage values at CTM(A) 354a and CTM(B) 354b are configured to remain at their respective high values throughout the entire read out period (e.g., 4.2 V and 1.4 V, respectively). The voltage value at CBM(C) 354c is configured to be at the image signal value when SHS is read out, at its high value (e.g., 2.8 V) when SHR is read out, and at its low value (e.g., 0 V) in between the SHS and SHR readouts.

It is appreciated that the illustrated timing diagram can be applied by pixel circuits other than the pixel circuit 204 illustrated in FIG. 2, and that the pixel circuit 204 can be operated based on a timing diagram different from the timing diagram illustrated in FIG. 3.

FIGS. 4A-D illustrate changes in biasing of a first LOFIC CAP1 454-1 and a second LOFIC CAP2 454-2 included in an example pixel circuit during an idle period and an integration period in accordance with the teachings of the present disclosure. It is appreciated that the biasing diagrams of FIGS. 4A-D may be example biasing diagrams of first and second LOFICs 254-1, 254-2 as shown in FIG. 2, and that similarly named and numbered elements described above are coupled and function similarly below.

Figure 4A:
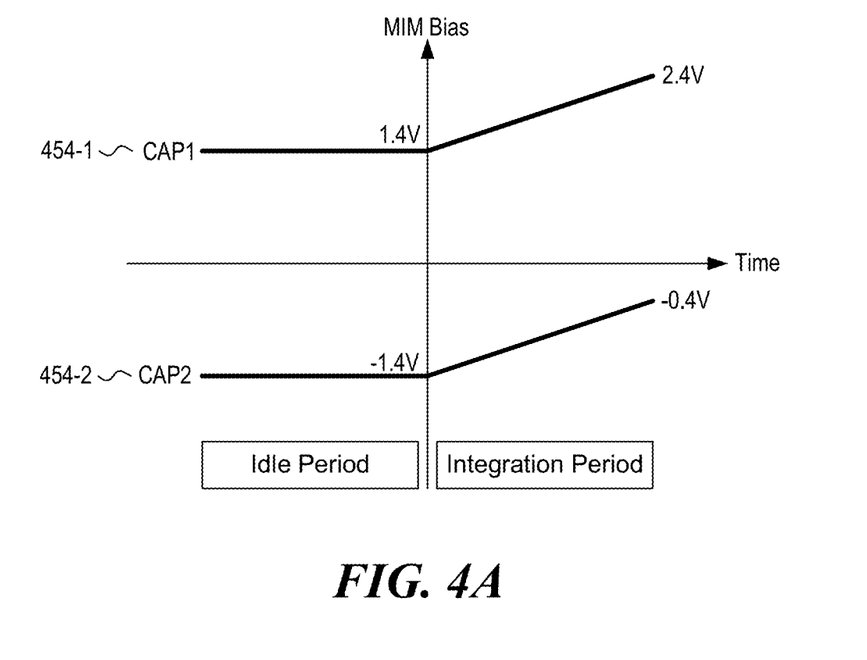
FIGS. 4A-D illustrate changes in biasing of LOFICs included in an example pixel circuit during an idle period and an integration period in accordance with the teachings of the present disclosure.
Figure 4B:
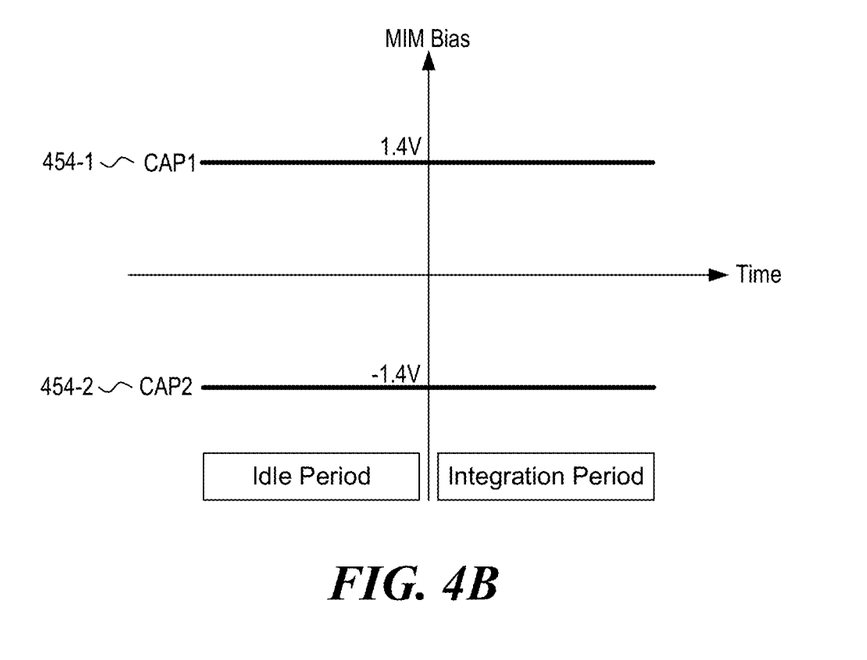

FIGS. 4A-B illustrate changes in biasing of the first and second LOFICs 454-1, 454-2 in light and dark frames, respectively, when coupled to bias voltage sources with a first set of voltage settings. The changes in biasing illustrated in FIGS. 4A-B can correspond to the timing diagram illustrated in FIG. 3. For example, during the idle period of the pixel circuit, the voltage value at node A (illustrated in FIG. 2) can be set a high value such as 2.8 V by configuring the voltage supplied from the first bias voltage source (e.g., first bias voltage source Vcap-1 248-1), the voltage value at node B can be set at a low value such as a ground reference voltage or 0 V by configuring the voltage supplied from the second bias voltage source (e.g., second bias voltage source Vcap-2 248-2), and the voltage value at node C can be set at 1.4 V by configuring the pixel voltage source (e.g., Pixel VDD 360) coupled to the node C through the reset transistor RST 234. Accordingly, during the idle period, the first LOFIC 454-1 is configured to be biased by a voltage difference between node A and node C (e.g., voltage value at A−voltage value at C=2.8 V−1.4 V=1.4 V (i.e., forward biased by a magnitude of 1.4 V)), and the second LOFIC 454-2 is configured to be biased by a voltage difference between node B and node C (e.g., voltage value at B−voltage value at B C=0 V−1.4 V=−1.4 V (i.e., reverse biased by a magnitude of 1.4 V)).

During the integration period in a light frame (e.g., a frame capture in presence of incident light), as shown in FIG. 4A, the voltage values at nodes A and B may remain at 2.8 V and 0 V, respectively, but the voltage value at node C decreases from 1.4 V to 0.4 V due to overflow image charge(s) from the photodiode. Consequently, the forward biasing magnitude of the first LOFIC 454-1 is configured to increase to 2.8 V−0.4 V=2.4 V and the reverse biasing magnitude of the second LOFIC 454-2 is configured to decrease to 0.4 V (i.e., |0 V−0.4 V|=0.4V). During the integration period in a dark frame (e.g., a frame capture in absence of incident light), as shown in FIG. 4B, the biasing of the first and second LOFICs 454-1, 454-2 are configured to remain at their respective values at the beginning of the integration period in the light frame (i.e., 1.4 V and −1.4 V, respectively) while maintaining the voltage at node C.

Figure 4C:
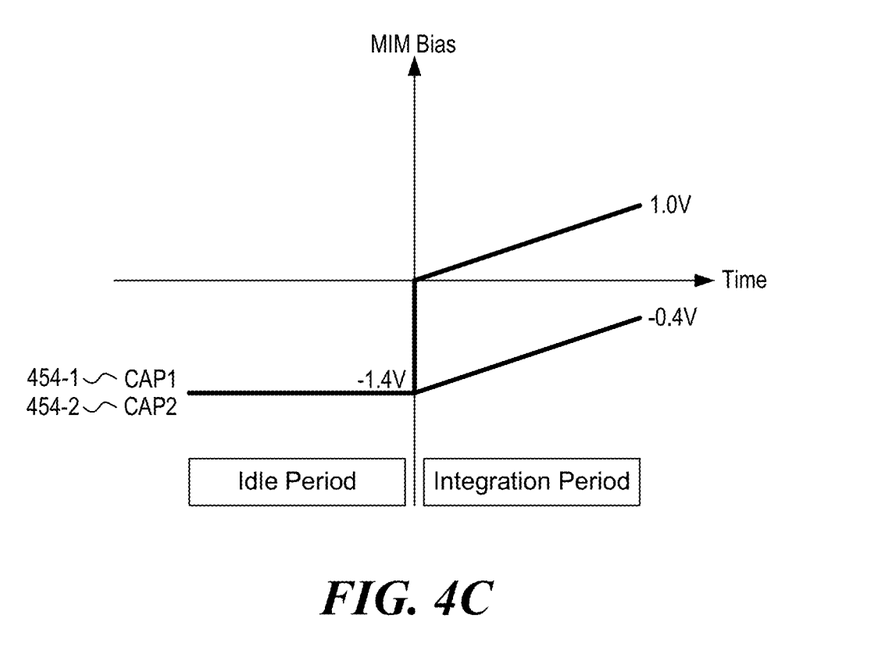
Figure 4D:
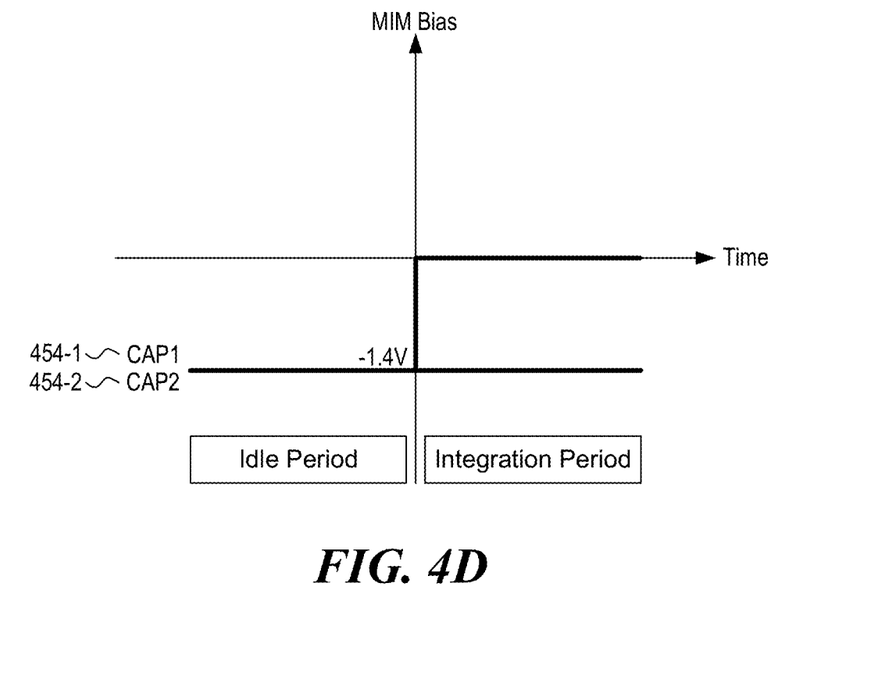

FIGS. 4C-D illustrate changes in biasing of the first and second LOFICs 454-1, 454-2 in light and dark frames, respectively, when coupled to first and second bias voltage sources with a second set of voltage settings. For example, during the idle period, the voltage values at nodes A and B can remain at 0 V while the voltage value at node C remains at a preset voltage value (e.g., 1.4 V), resulting in both the first and second LOFICs 454-1, 454-2 to be reverse biased by a magnitude of 1.4 V.

During the integration period in a light frame, as shown in FIG. 4C, the voltage value across the first and second LOFICs 454-1, 454-2 can jump to 1.4 V, the voltage value at node B can remain at 0 V, and the voltage value at node C can decrease from 1.4 V to 0.4 V due to overflow image charge(s) from the photodiode, for example when the photodiode saturates. Consequently, the forward biasing magnitude of the first LOFIC is configured to increase to 1.4 V−0.4 V=1.0 V and the reverse biasing magnitude of the second LOFIC is configured to decrease to 0.4 V (i.e., absolute value of 0 V−0.4 V=|−0.4 V|). During the integration period in a dark frame, as shown in FIG. 4B, the biasing of the first and second LOFICs 454-1, 454-2 are configured to remain at their respective values at the beginning of the integration period in the light frame (i.e., 0 V and −1.4 V, respectively).

Referring to FIGS. 3, 4A, and 4C together, the first LOFIC is configured to be forward biased and the second LOFIC is configured to be reverse biased at the end of the integration period. During the read out period, which follows the integration period, the first LOFIC is configured to discharge image charge while the second LOFIC is configured to source image charge. Given that the biasing of the first and second LOFICs are opposite, their discharges (e.g., charges trapped in their respective high-k materials from previous frame(s)) have opposite charges and thus compensate each other, allowing the pixel circuit to maintain the signal voltage and mitigate MIM lag created during the integration period.

Figure 5:
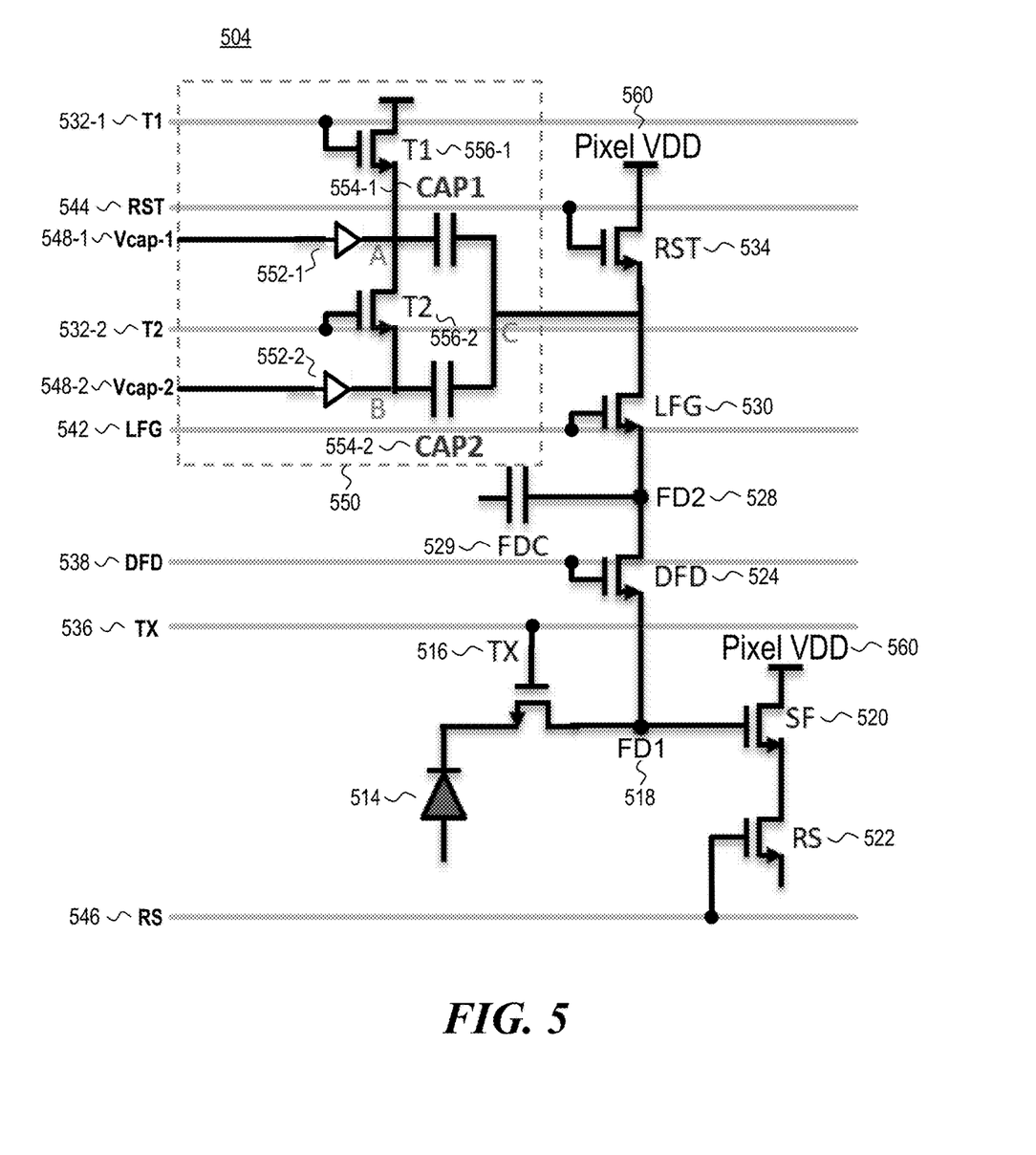
FIG. 5 illustrates a schematic of an example pixel circuit including LOFICs in accordance with the teachings of the present disclosure.

FIG. 5 illustrates a schematic of an example pixel circuit 504 including LOFICs 554 in accordance with the teachings of the present disclosure. It is appreciated that the pixel circuit 504 of FIG. 5 may be an example of the pixel circuits 104 included in the imaging system 100 as shown in FIG. 1, and that similarly named and numbered elements described above are coupled and function similarly below.

In the illustrated example, the pixel circuit 504 includes a photodiode 514 configured to photogenerate image charge in response to incident light. A first floating diffusion FD1 518 is coupled to receive the image charge from the photodiode 514. A transfer transistor TX 516 is coupled between the photodiode 514 and the first floating diffusion FD1 518 to transfer the image charge from the photodiode 514 to the first floating diffusion FD1 518. A reset transistor RST 534 is coupled between a pixel voltage source Pixel VDD 560 and the first floating diffusion FD1 518. A lateral overflow gate transistor LFG 530 is coupled between the reset transistor RST 534 and the first floating diffusion FD1 518. A dual floating diffusion transistor DFD 524 is coupled between the lateral overflow gate transistor LFG 530 and the first floating diffusion FD1 518. A second floating diffusion FD2 528 is coupled between the lateral overflow gate transistor LFG 530 and the dual floating diffusion transistor DFD 524. A floating diffusion capacitor FDC 529 is coupled to the second floating diffusion FD2 528. A source follower transistor SF 520 is coupled between the pixel voltage source Pixel VDD 560 and a row select transistor RS 522, which is coupled to a bitline (e.g., column bitline 112 of FIG. 1). The gate terminal of the source follower transistor SF 520 is coupled to the first floating diffusion FD1 518.

The transfer transistor TX 516 is configured to be switched in response to a transfer control signal TX 536. The reset transistor RST 534 is configured to be switched in response to a reset control signal RST 544 and is configured to reset the pixel circuit 504 during, for example, an idle period, a precharge period, and between image signal and reset signal readouts. The dual floating diffusion transistor DFD 524 is configured to be switched in response to a dual floating diffusion control signal DFD 538 and is configured to transfer image charge from the first floating diffusion FD1 518 to the second floating diffusion FD2 528, allowing image charges overflowing from the photodiode 514 to the second floating diffusion FD2 528 through the lateral overflow gate transistor LFG 530 and the dual floating diffusion transistor DFD 524. The lateral overflow gate transistor LFG 530 is configured to be switched in response to a lateral overflow gate control signal LFG 542. The row select transistor RS 522 is configured to be switched in response to a row select control signal RS 546 and is configured to transfer signals from the source follower transistor SF 520 to the bitline. It is appreciated that the pixel circuit 504 can include fewer, additional, and/or alternative components (e.g., transistors, capacitors, buffers, switches) depending on the particular requirements of the imaging system.

The pixel circuit 504 further includes a lateral overflow integration capacitor (LOFIC) network 550 coupled to the first floating diffusion FD1 518, a first bias voltage source Vcap-1 548-1, and a second bias voltage source Vcap-2 548-2. In the illustrated example, the LOFIC network 550 is coupled to a node between the reset transistor RST 534 and the lateral overflow gate transistor LFG 530. The LOFIC network 550 can include a first LOFIC CAP1 554-1 coupled between the first floating diffusion FD1 518 and the first bias voltage source Vcap-1 548-1, and a second LOFIC CAP2 554-2 coupled between the first floating diffusion FD1 518 and the second bias voltage source Vcap-2 548-2. The lateral overflow gate transistor LFG 530 may be configured to transfer or allow overflow image charges from the photodiode 514 to overflow from second floating diffusion FD2 528 to the first LOFIC CAP1 554-1 or second LOFIC CAP2 554-2. The LOFIC network 550 can further include a first voltage buffer 552-1 coupled between the first LOFIC 554-1 and the first bias voltage source Vcap-1 548-1, and a second voltage buffer 552-2 coupled between the second LOFIC 554-2 and the second bias voltage source Vcap-2 548-2.

It is appreciated that each LOFIC 554-1, 554-2 includes a first metal electrode, which may be referred to as a capacitor top metal (CTM), and a second metal electrode, which may be referred to as a capacitor bottom metal (CBM). As such, the CTM of the first LOFIC 554-1 is coupled to the first voltage buffer 552-1 at node A, the CTM of the second LOFIC 554-2 is coupled to the second voltage buffer 552-2 at node B, and the CBMs of the first and second LOFICs 554-1, 554-2 are coupled to the lateral overflow gate transistor LFG 530 at node C. It is appreciated that the first bias voltage source Vcap-1 548-1 and the second bias voltage source Vcap-2 548-2 can be configured to forward bias, zero bias, or reverse bias the first and second LOFICs 554-1, 554-2, respectively, by adjusting the voltage values at nodes A and B higher than, equal to, or lower than the voltage value at node C.

The illustrated LOFIC network 550 further includes a first local reset transistor T1 556-1 coupled between the pixel voltage source Pixel VDD 560 and the first LOFIC 554-1 (i.e., between Pixel VDD 560 and node A), and a second local reset transistor T2 556-2 coupled between the first local reset transistor T1 556-1 and the second LOFIC 554-2 (i.e., between nodes A and B). The first local reset transistor T1 556-1 is configured to be switched in response to a first local reset control signal T1 532-1, and the second local reset transistor T2 556-2 is configured to be switched in response to a second local reset control signal T2 532-2. The first and second local reset transistors T1 556-1, T2 556-2 are configured to provide MIM local resets, reduce the loading effect, and improve the settling time of the first and second LOFICs 554-1, 554-2.

Figure 6:
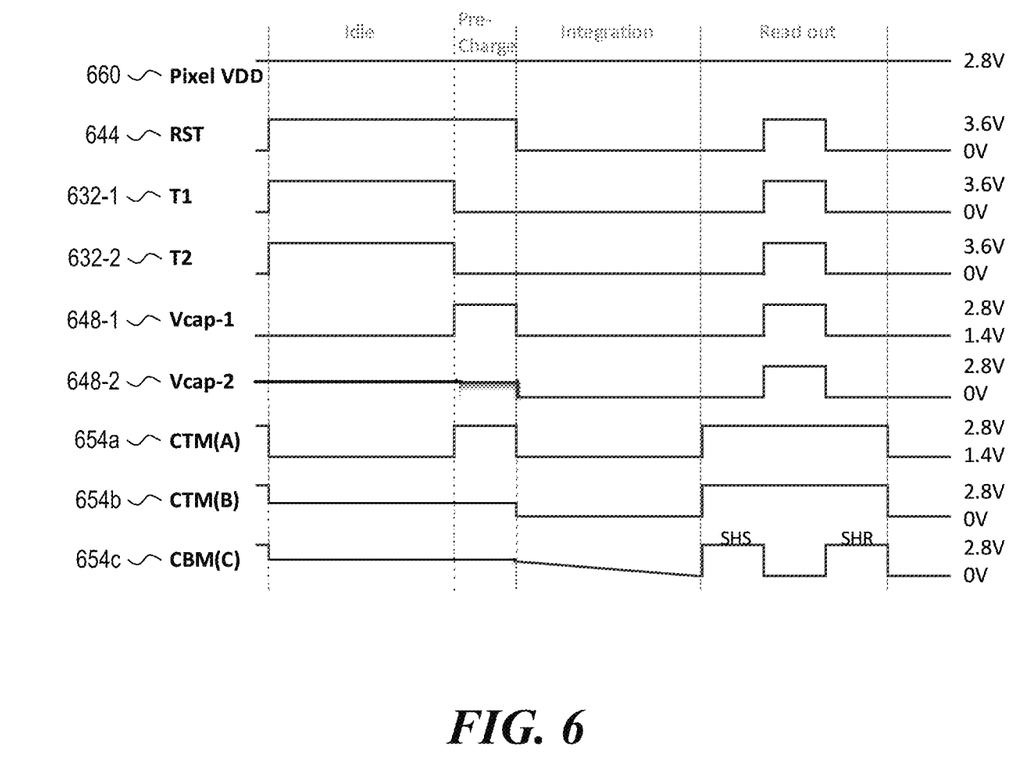
FIG. 6 illustrates a timing diagram of an example pixel circuit including LOFICs in accordance with the teachings of the present disclosure.

FIG. 6 illustrates a timing diagram of an example pixel circuit including LOFICs in accordance with the teachings of the present disclosure. It is appreciated that the timing diagram of FIG. 6 may be an example timing diagram of pixel circuit 504 as shown in FIG. 5, and that similarly named and numbered elements described above are coupled and function similarly below.

In the illustrated example, the timing diagram includes an idle period, a precharge period, an integration period, and a read out period. The precharge period may be between the idle period and the integration period. The idle period may be before the integration period of a current frame or after the read out period of a previous frame that is preceding the current frame. The timing diagram depicts a pixel voltage source Pixel VDD 660, a reset control signal RST 644, a first local reset control signal T1 632-1, a second local reset control signal T2 632-2, a first bias voltage source Vcap-1 648-1, a second bias voltage source Vcap-2 648-2, a voltage value at the CTM of a first LOFIC (e.g., at node A illustrated in FIG. 5) 654a, a voltage value at the CTM of a second LOFIC (e.g., at node B) 654b, and a voltage value at the CBM of the first and second LOFICs (e.g., at node C) 654c. In the illustrated example, the pixel voltage source Pixel VDD 660 is configured to remain at a constant non-zero value (e.g., 2.8 V) throughout the entire timing diagram.

The voltage values at CTM(A) 654a and CTM(B) 654b can be controlled by adjusting voltage values outputted by the first and second bias voltage sources Vcap-1 648-1, Vcap-2 648-2, respectively, as well as through the use of buffers (e.g., the first and second voltage buffers 552-1, 552-2). The voltage value at CBM(C) 654c can vary depending on the amount of overflow charges that flow from a photodiode (e.g., from the photodiode 514 coupled thereto and past the lateral overflow gate transistor LFG 530). When the voltage value at CTM(A) 654a or CTM(B) 654b exceeds the voltage value at CBM(C) 654c, the first or second LOFIC is configured to be forward biased. Conversely, when the voltage value at CTM(A) 654a or CTM(B) 654b is smaller than the voltage value at CBM(C) 654c, the first or second LOFIC is configured to be reverse biased. When the voltage value at CTM(A) 654a or CTM(B) 654b is equal to the voltage value at CBM(C) 654c, the first or second LOFIC is configured to be zero biased.

As shown during the idle period, the reset control signal RST 644, the first local reset control signal T1 632-1, and the second local reset control signal T2 632-2 are configured to be at high values (e.g., 3.6 V) in order to reset the pixel circuit. The first bias voltage source Vcap-1 648-1, the second bias voltage source Vcap-2 648-2, the voltage value at CTM(A) 654a, the voltage value at CTM(B) 654b, and the voltage value at CBM(C) 654c are all configured to be at a common voltage such as at 1.4 V such that the first and second LOFICs are zero biased during the idle period, allowing the first and second LOFICs to discharge.

As shown during the precharge period, the pixel voltage source Pixel VDD 660 and the reset control signal RST 644 can be configured to remain at their respective high values (e.g., 2.8 V and 3.6 V, respectively). The first and second local reset control signals T1 632-1, T2 632-2 are configured to switch to their low values (e.g., 0 V). The first bias voltage source Vcap-1 648-1 and the voltage value at CTM(A) 654a are configured to switch to their high values (e.g., 2.8 V), while the second bias voltage source Vcap-2 648-2 and the voltage values at CTM(B) 654b and CBM(C) 654c are configured to remain at their intermediate values (e.g., 1.4 V). Consequently, the first LOFIC is configured to be forward biased and the second LOFIC is configured to remain zero biased during the precharge period. In other embodiments, the first bias voltage source Vcap-1 648-1 and the voltage value at CTM(A) 654a are configured to remain at 1.4 V such that the first LOFIC remains zero biased during the precharge period. In other embodiments, the voltage value at CBM(C) 654c is configured to decrease to 1 V such that the second LOFIC is forward biased during the precharge period.

As shown during the integration period, the reset control signal RST 644, the first bias voltage source Vcap-1 648-1, the second bias voltage source Vcap-2 648-2, the voltage value at CTM(A) 654a, and the voltage value at CTM(B) 654b are configured to be switched to their respective low values. The first and second local reset control signals T1 632-1, T2 632-2 are configured to remain off. The photodiode can be configured to photogenerate image charge in response to incident light. Overflow image charge from the photodiode can be transferred to the first and second LOFICs, lowering the voltage value at CBM(C) 654c (e.g., from 1.4 V to 0.7 V). In the illustrated timing diagram, the first and second LOFICs are configured to be forward biased and reverse biased, respectively, during the integration period.

As shown during the read out period, a sample-and-hold image signal ("SHS") and a sample-and-hold reset signal ("SHR") are read out sequentially. In the illustrated example, the reset control signal RST 644, the first local reset control signal T1 632-1, the second local reset control signal T2 632-2, the first bias voltage source Vcap-1 648-1, and the second bias voltage source Vcap-2 648-2 are configured to pulse at their respective high values after the SHS readout in preparation for the SHR readout. The voltage values at CTM(A) 654a and CTM(B) 654b are configured to remain at their respective high values throughout the entire read out period (e.g., 2.8 V). The voltage value at CBM(C) 654c is configured to be at the image signal value when SHS is read out, at its high value (e.g., 2.8 V) when SHR is read out, and at its low value (e.g., 0 V) in between the SHS and SHR readouts.

It is appreciated that the illustrated timing diagram can be applied by pixel circuits other than the pixel circuit 504 illustrated in FIG. 5, and that the pixel circuit 504 can be operated based on a timing diagram different from the timing diagram illustrated in FIG. 6.

Figure 7A:
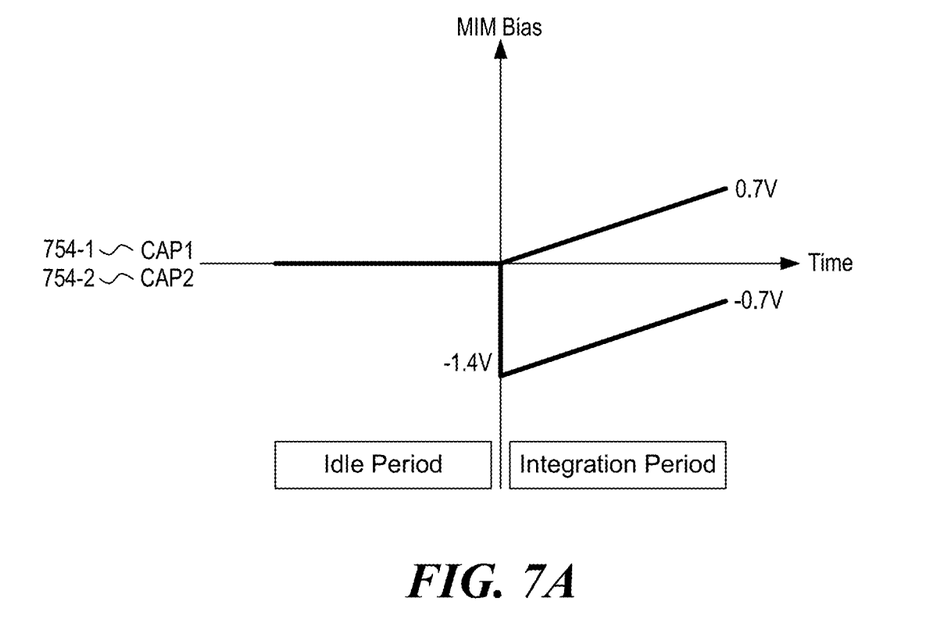
FIGS. 7A-B illustrate changes in biasing of LOFICs included in an example pixel circuit during an idle period and an integration period in accordance with the teachings of the present disclosure.
Figure 7B:
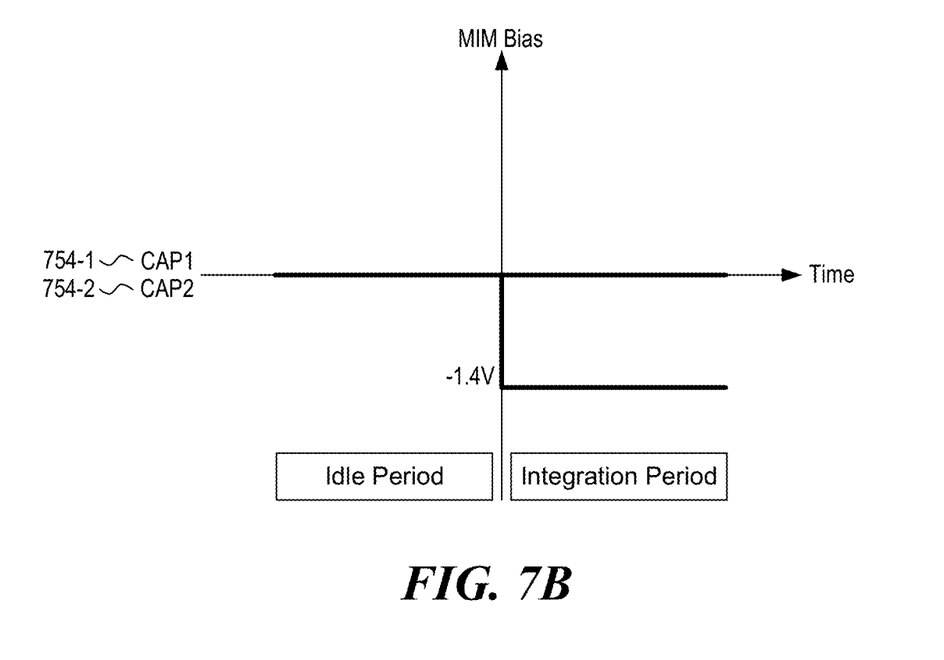

FIGS. 7A-B illustrate changes in biasing of a first LOFIC CAP1 754-1 and a second LOFIC CAP2 754-2 included in an example pixel circuit during an idle period and an integration period in accordance with the teachings of the present disclosure. FIG. 7A depicts the changes in a light frame and FIG. 7B depicts the changes in a dark frame. It is appreciated that the biasing diagrams of FIGS. 7A-B may be example biasing diagrams of first and second LOFICs 554-1, 554-2 as shown in FIG. 5, and that similarly named and numbered elements described above are coupled and function similarly below.

The changes in biasing illustrated in FIGS. 7A-B can correspond to the timing diagram illustrated in FIG. 6. For example, during the idle period, the voltage value at nodes A, B, and C (illustrated in FIG. 5) can be 1.4 V. Accordingly, both the first and second LOFICs 754-1, 754-2 are configured to be zero biased during the idle period such that the first and second LOFICs 754-1, 754-2 may operate to discharge residue charges (e.g., charges trapped in their high-k materials) during the idle period.

During the integration period in a light frame, as shown in FIG. 7A, the voltage values at nodes A and B are configured to be at 1.4 V and 0 V, respectively, but the voltage value at node C decreases from 1.4 V to 0.7 V due to overflow image charge from the photodiode. Consequently, the forward biasing magnitude of the first LOFIC is configured to increase to 1.4 V−0.7 V=0.7 V and the reverse biasing magnitude of the second LOFIC is configured to decrease to 0.7 V (i.e., absolute value of 0 V−0.7 V=|−0.7 V|). During the integration period in a dark frame, as shown in FIG. 7B, the biasing of the first and second LOFICs 754-1, 754-2 are configured to remain at their respective values at the beginning of the integration period in the light frame (i.e., 0 V and −1.4 V, respectively).

Referring to FIGS. 6 and 7A together, the first LOFIC 754-1 is configured to be forward biased and the second LOFIC 754-2 is configured to be reverse biased at the end of the integration period. During the read out period, which follows the integration period, the first LOFIC 754-1 is configured to discharge image charge while the second LOFIC 754-2 is configured to source image charge. Given that the biasing of the first and second LOFICs 754-1, 754-2 are opposite, their discharges have opposite charges and thus compensate each other, allowing the pixel circuit to maintain the signal voltage and mitigate MIM lag created during the integration period.

Compared to the embodiments illustrated in FIGS. 2, 3, and 4A-D, the embodiments illustrated in FIGS. 5, 6, and 7A-B include local reset transistors configured to provide MIM local resets, reduce the loading effect, and improve the settling time of the first and second LOFICs. Moreover, the maximum biasing magnitude of either LOFIC is smaller in the latter embodiments (e.g., 1.4 V for LOFIC 754-2 illustrated in FIG. 7A compared to 2.4 V for LOFIC 454-1 illustrated in FIG. 4A), which can further reduce MIM lag.

The above description of illustrated examples of the disclosure, including what is described in the Abstract, is not intended to be exhaustive or to limit the disclosure to the precise forms disclosed. While specific examples of the disclosure are described herein for illustrative purposes, various modifications are possible within the scope of the disclosure, as those skilled in the relevant art will recognize.

These modifications can be made to the disclosure in light of the above detailed description. The terms used in the following claims should not be construed to limit the disclosure to the specific examples disclosed in the specification. Rather, the scope of the disclosure is to be determined entirely by the following claims, which are to be construed in accordance with established doctrines of claim interpretation.

What is claimed is:

1. A pixel circuit, comprising:
a photodiode configured to photogenerate one or more image charges in response to incident light;
a floating diffusion coupled to receive the one or more image charges from the photodiode;
a transfer transistor coupled between the photodiode and the floating diffusion to transfer the one or more image charges from the photodiode to the floating diffusion;
a reset transistor coupled between a pixel voltage source and the floating diffusion, wherein the reset transistor is configured to be switched in response to a reset control signal;
a lateral overflow integration capacitor (LOFIC) network coupled to the floating diffusion, a first bias voltage source, and a second bias voltage source, the LOFIC network comprising:
a first LOFIC coupled between the floating diffusion and the first bias voltage source; and
a second LOFIC coupled between the floating diffusion and the second bias voltage source;
wherein the first LOFIC is configured to be forward biased and the second LOFIC is configured to be reverse biased at an end of an integration period, and
wherein charge discharged from the first LOFIC and charge discharged from the second LOFIC compensate each other during a readout period.

2. The pixel circuit of claim 1, wherein the first LOFIC is configured to be forward biased during the integration period, and wherein the second LOFIC is configured to be reverse biased during the integration period.

3. The pixel circuit of claim 1, wherein the first LOFIC is configured to be forward biased during an idle period occurring before the integration period, and wherein the second LOFIC is configured to be reverse biased during the idle period.

4. The pixel circuit of claim 1, wherein the first and second LOFICs are configured to be reverse biased during an idle period.

5. The pixel circuit of claim 1, wherein a forward biasing magnitude of the first LOFIC is configured to increase during the integration period based on an amount of overflow image charges received from the photodiode by the first LOFIC, and wherein a reverse biasing magnitude of the second LOFIC is configured to decrease during the integration period based on an amount of overflow image charges received from the photodiode by the second LOFIC.

6. The pixel circuit of claim 1, wherein the LOFIC network further comprises:
a first local reset transistor coupled between the pixel voltage source and the first LOFIC; and
a second local reset transistor coupled between the first local reset transistor and the second LOFIC.

7. The pixel circuit of claim 6, wherein the first and second local reset transistors are configured to be on during an idle period, and wherein the first and second local reset transistors are configured to be off during a precharge period and the integration period.

8. The pixel circuit of claim 6, wherein the first and second local reset transistors are configured to be off during a reset signal readout period and an image signal readout period, and wherein the first and second local reset transistors are configured to be on during a period between the reset signal readout period and the image signal readout period.

9. The pixel circuit of claim 6, wherein the first and second LOFICs are configured to be zero biased during an idle period occurring before the integration period.

10. The pixel circuit of claim 1, wherein the reset transistor is configured to be on, the first bias voltage source is configured to be at a first low voltage, and the second bias voltage source is configured to be at a second low voltage during an idle period occurring before the integration period, wherein the reset transistor is configured to be on, the first bias voltage source is configured to be at a first high voltage, and the second bias voltage source is configured to be at a second high voltage during a precharge period occurring between the idle period and the integration period, and wherein the reset transistor is configured to be off, the first bias voltage source is configured to be at the first low voltage, and the second bias voltage source is configured to be at the second low voltage during the integration period.

11. The pixel circuit of claim 1, wherein the LOFIC network further comprises:
a first voltage buffer coupled between the first LOFIC and the first bias voltage source; and
a second voltage buffer coupled between the second LOFIC and the second bias voltage source.

12. A method of operating a pixel circuit, comprising:
during an integration period—
photogenerating image charge in a photodiode in response to incident light;
transferring at least one overflow image charge from the photodiode to a lateral overflow integration capacitor (LOFIC) network of the pixel circuit when the photodiode saturates, wherein the LOFIC network comprises a first LOFIC coupled between the floating diffusion and a first bias voltage source, and a second LOFIC coupled between the floating diffusion and a second bias voltage source;
configuring the first bias voltage source to be at a first low voltage such that the first LOFIC is forward biased at an end of the integration period; and
configuring the second bias voltage source to be at a second low voltage such that the second LOFIC is reverse biased at the end of the integration period; and
during a readout period—
configuring the first and second LOFICs to discharge image charge, wherein image charge discharged from the first LOFIC and image charge discharged from the second LOFIC compensate each other.

13. The method of claim 12, further comprising:
during an idle period occurring before the integration period—
configuring the first bias voltage source to be at the first low voltage such that the first LOFIC is forward biased; and
configuring the second bias voltage source to be at the second low voltage such that the second LOFIC is reverse biased.

14. The method of claim 12, further comprising:
during an idle period occurring before the integration period—
configuring the first bias voltage source to be at the first low voltage such that the first LOFIC is reverse biased; and
configuring the second bias voltage source to be at the second low voltage such that the second LOFIC is reverse biased.

15. The method of claim 12, further comprising:
during the integration period—
configuring a forward biasing magnitude of the first LOFIC to increase based on an amount of overflow image charges received from the photodiode by the first LOFIC; and
configuring a reverse biasing magnitude of the second LOFIC to decrease based on an amount of overflow image charges received from the photodiode by the second LOFIC.

16. The method of claim 12, wherein the LOFIC network further comprises a first local reset transistor coupled between a pixel voltage source and the first LOFIC and a second local reset transistor coupled between the first local reset transistor and the second LOFIC.

17. The method of claim 16, further comprising:
during an idle period—
configuring the first and second local reset transistors to be on;
during a precharge period occurring between the idle period and the integration period—
configuring the first and second local reset transistors to be off; and
during the integration period—
configuring the first and second local reset transistors to remain off.

18. The method of claim 16, further comprising:
during the readout period—
configuring the first and second local reset transistors to be off during a reset signal readout period and an image signal readout period; and
configuring the first and second local reset transistors to be on during a period between the reset signal readout period and the image signal readout period.

19. The method of claim 16, further comprising:
during an idle period—
configuring the first bias voltage source to be at the first low voltage such that the first LOFIC is zero biased; and
configuring the second bias voltage source to be at the second low voltage such that the second LOFIC is zero biased.

20. The method of claim 12, wherein the LOFIC network further comprises:
a first voltage buffer coupled between the first LOFIC and the first bias voltage source; and
a second voltage buffer coupled between the second LOFIC and the second bias voltage source.

* * * * *